(12) United States Patent
Hwang et al.

(10) Patent No.: US 9,692,573 B2
(45) Date of Patent: Jun. 27, 2017

(54) METHOD AND DEVICE FOR REPORTING CHANNEL STATE INFORMATION

(71) Applicant: LG ELECTRONICS INC., Seoul (KR)

(72) Inventors: Daesung Hwang, Anyang-si (KR); Dongyoun Seo, Anyang-si (KR); Joonkui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 18 days.

(21) Appl. No.: 14/401,425

(22) PCT Filed: May 16, 2013

(86) PCT No.: PCT/KR2013/004364
§ 371 (c)(1),
(2) Date: Nov. 14, 2014

(87) PCT Pub. No.: WO2013/172674
PCT Pub. Date: Nov. 21, 2013

(65) Prior Publication Data
US 2015/0146634 A1 May 28, 2015

Related U.S. Application Data

(60) Provisional application No. 61/648,577, filed on May 17, 2012, provisional application No. 61/682,304, (Continued)

(51) Int. Cl.
*H04L 5/00* (2006.01)
*H04L 1/00* (2006.01)
(Continued)

(52) U.S. Cl.
CPC .......... *H04L 5/0053* (2013.01); *H04L 1/0026* (2013.01); *H04L 1/0031* (2013.01);
(Continued)

(58) Field of Classification Search
CPC ..... H04L 12/26; H04L 1/0027; H04L 1/1671; H04L 5/0053; H04L 5/001; H04L 1/0023;
(Continued)

(56) References Cited

U.S. PATENT DOCUMENTS

2010/0272019 A1   10/2010   Papasakellariou et al.
2011/0249578 A1*  10/2011   Nayeb Nazar ........ H04L 1/0027
                                                370/252
(Continued)

FOREIGN PATENT DOCUMENTS

EP   2597799 A2   5/2013
JP   WO 2013166699 A1 *  11/2013   ........... H04L 1/0026
(Continued)

OTHER PUBLICATIONS

3GPP TSG RAN WG1 Meeting #67, R1-113718, "Discussions on multi-CC periodic CSI reporting in LTE-A Rel-11", CATT, Agenda Item: 7.2.1.2, pp. 1-5, Nov. 14-18, 2011, San Francisco, U.S.A.

*Primary Examiner* — Jae Y Lee
*Assistant Examiner* — Aixa Guadalupe-Cruz
(74) *Attorney, Agent, or Firm* — Birch, Stewart, Kolasch & Birch, LLP (57) ABSTRACT

A method and device for reporting channel state information (CSI) is provided. A wireless device codes uplink control information (UCI) including CSI to create encoded UCI and transmits the encoded UCI. When the CSI includes a rank indicator (RI), the payload size of the CSI is determined according to the RI, and if the CSI does not include the RI, the payload size of the CSI is fixed.

6 Claims, 6 Drawing Sheets

Related U.S. Application Data filed on Aug. 12, 2012, provisional application No. 61/683,722, filed on Aug. 16, 2012, provisional application No. 61/684,145, filed on Aug. 17, 2012, provisional application No. 61/699,240, filed on Sep. 10, 2012.

(51) Int. Cl.
    *H04W 24/10*     (2009.01)
    *H04L 27/26*     (2006.01)

(52) U.S. Cl.
    CPC .......... *H04L 1/0057* (2013.01); *H04L 1/0073* (2013.01); *H04L 5/0057* (2013.01); *H04W 24/10* (2013.01); *H04L 27/2602* (2013.01)

(58) Field of Classification Search
    CPC ....... H04L 1/0028; H04L 5/00; H04L 5/0057; H04L 1/0073; H04L 1/0026; H04L 1/0031; H04L 1/0057; H04W 72/04; H04W 24/10; H04J 11/00
    See application file for complete search history.

(56) References Cited

U.S. PATENT DOCUMENTS

| | | |
|---|---|---|
| 2011/0249643 A1 | 10/2011 | Barbieri et al. |
| 2011/0269490 A1 | 11/2011 | Earnshaw et al. |
| 2012/0076023 A1 | 3/2012 | Ko et al. |
| 2012/0127869 A1* | 5/2012 | Yin ................. H04L 1/0031 370/252 |
| 2012/0257531 A1 | 10/2012 | Ko et al. |
| 2012/0307760 A1 | 12/2012 | Han et al. |
| 2013/0121299 A1 | 5/2013 | Kim et al. |

FOREIGN PATENT DOCUMENTS

| | | |
|---|---|---|
| WO | WO 2011/074923 A2 | 6/2011 |
| WO | WO 2011/087260 A2 | 7/2011 |
| WO | WO 2012/011657 A2 | 1/2012 |
| WO | WO 2012/011718 A2 | 1/2012 |
| WO | WO 2012/060550 A2 | 5/2012 |

* cited by examiner

METHOD AND DEVICE FOR REPORTING CHANNEL STATE INFORMATION

CROSS REFERENCE TO RELATED APPLICATIONS

This application is the National Phase of PCT International Application No. PCT/KR2013/004364, filed on May 16, 2013, which claims priority under 35 U.S.C. 119(e) to U.S. Provisional Application Nos. 61/648,577, filed on May 17, 2012, 61/682,304, filed on Aug. 12, 2012, 61/683,722, filed on Aug. 16, 2012, 61/684,145, filed on Aug. 17, 2012 and 61/699,240, filed on Sep. 10, 2012, all of which are hereby expressly incorporated by reference into the present application.

BACKGROUND OF THE INVENTION

Field of the Invention

The present invention relates to wireless communications, and more particularly, to a method and apparatus for reporting channel state information in a wireless communication system.

Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of the LTE can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

The uplink channel is used to transmit a variety of uplink control information such as hybrid automatic repeat request (HARQ) positive-acknowledgement (ACK)/negative-acknowledgement (NACK), channel state information (CSI), and scheduling request (SR).

With the introduction of a scheme of increasing channel capacity such as multiple input multiple output (MIMO) and carrier aggregation (CA), an amount of uplink control information is also increased. A radio resource for an uplink channel may be more restrictive than a radio resource for a downlink channel, and a transmission error of the uplink control information may aggravate service quality.

There is a need to design a coding and power control for an uplink channel according to an increasing amount of the uplink control information.

SUMMARY OF THE INVENTION

The present invention provides a method of reporting channel state information and a wireless device using the method.

In an aspect, a method of reporting channel state information (CSI) in a wireless communication system is provided. The method includes receiving a configuration for CSI reporting, the configuration including a periodicity and an offset, determining a subframe in which the CSI is reported among a plurality of subframes according to the configuration, generating the CSI, coding uplink control information (UCI) containing the CSI to generate encoded UCI, modulating the encoded UCI to generate a modulation sequence, and transmitting the modulation sequence in the determined subframe on an uplink channel. If the CSI includes a rank indicator (RI), a payload size of the CSI is determined according to the RI. If the CSI does not include the RI, the payload size of the CSI is fixed.

If the CSI does not include the RI, the CSI may include at least one padding bit.

If the CSI does not include the RI, the CSI may include a channel quality indicator (CQI) and a precoding matrix indicator (PMI).

The at least one padding bit may be attached to a least significant bit (LSB) of the CSI.

The at least one padding bit may include a first padding bit and a second padding bit. The first padding bit may be attached to the CQI, and the second padding bit may be attached to the PMI.

In another aspect, a wireless device for reporting channel state information (CSI) in a wireless communication system includes a memory, and a processor operatively coupled to the memory. The processor is configured to receive a configuration for CSI reporting, the configuration including a periodicity and an offset, determine a subframe in which the CSI is reported among a plurality of subframes according to the configuration, generate the CSI, code uplink control information (UCI) containing the CSI to generate encoded UCI, modulate the encoded UCI to generate a modulation sequence, and transmit the modulation sequence in the determined subframe on an uplink channel. If the CSI includes a rank indicator (RI), a payload size of the CSI is determined according to the RI. If the CSI does not include the RI, the payload size of the CSI is fixed.

A variety of types and an increased amount of uplink control information can be transmitted, and a transmission error can be decreased.

DESCRIPTION OF EXEMPLARY EMBODIMENTS

A wireless device may be fixed or mobile, and may be referred to as another terminology, such as a user equipment (UE), a mobile station (MS), a user terminal (UT), a subscriber station (SS), a mobile terminal (MT), etc. A base station (BS) is generally a fixed station that communicates with the wireless device and may be referred to as another terminology, such as an evolved node-B (eNB), a base transceiver system (BTS), an access point, etc.

Hereinafter, the present invention is applied based on a $3^{rd}$ generation partnership project (3GPP) long term evolution (LTE) or a 3GPP LTE-Advanced (LTE-A). This is for exemplary purposes only, and thus the present invention is applicable to various communication systems. In the following description, LTE and/or LTE-A are collectively referred to as LTE.

The wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after a radio resource control (RRC) connection is established, and may be used to provide an additional radio resource. At least one primary cell is configured always. The secondary cell may be added/modified/released by using higher-layer signaling (e.g., an RRC message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
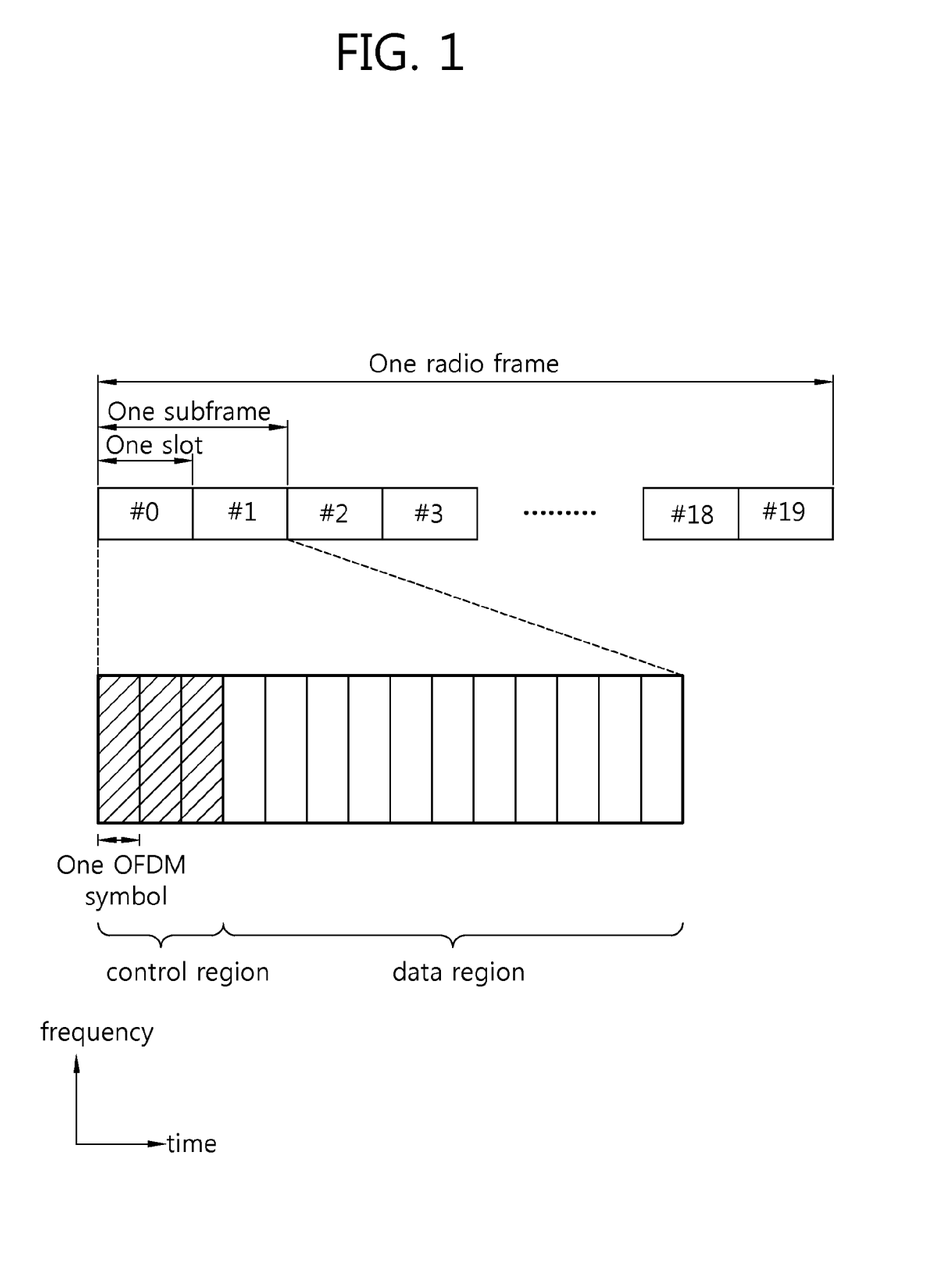
FIG. 1 shows a structure of a downlink (DL) radio frame in $3^{rd}$ generation partnership project (3GPP) long term evolution (LTE).

FIG. 1 shows a structure of a DL radio frame in 3GPP LTE. The section 4 of 3GPP TS 36.211 V10.4.0 (2011-12) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.4.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

As described in 3GPP TS 36.211 V10.4.0, in 3GPP LTE, a physical channel may be divided into a data channel and a control channel. The data channel may be a physical downlink shared channel (PDSCH) and a physical uplink shared channel (PUSCH). The control channel may be a physical downlink control channel (PDCCH), a physical control format indicator channel (PCFICH), a physical hybrid-ARQ indicator channel (PHICH), and a physical uplink control channel (PUCCH).

The PCFICH transmitted in a first OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

In 3GPP LTE, blind decoding is used to detect a PDCCH. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking. A BS determines a PDCCH format according to DCI to be transmitted to a wireless device, attaches a cyclic redundancy check (CRC) to control information, and masks a unique identifier (referred to as a radio network temporary identifier (RNTI)) to the CRC according to an owner or usage of the PDCCH.

According to 3GPP TS 36.211 V10.4.0, an uplink channel includes a PUSCH, a PUCCH, a sounding reference signal (SRS), and a physical random access channel (PRACH).

Figure 2:
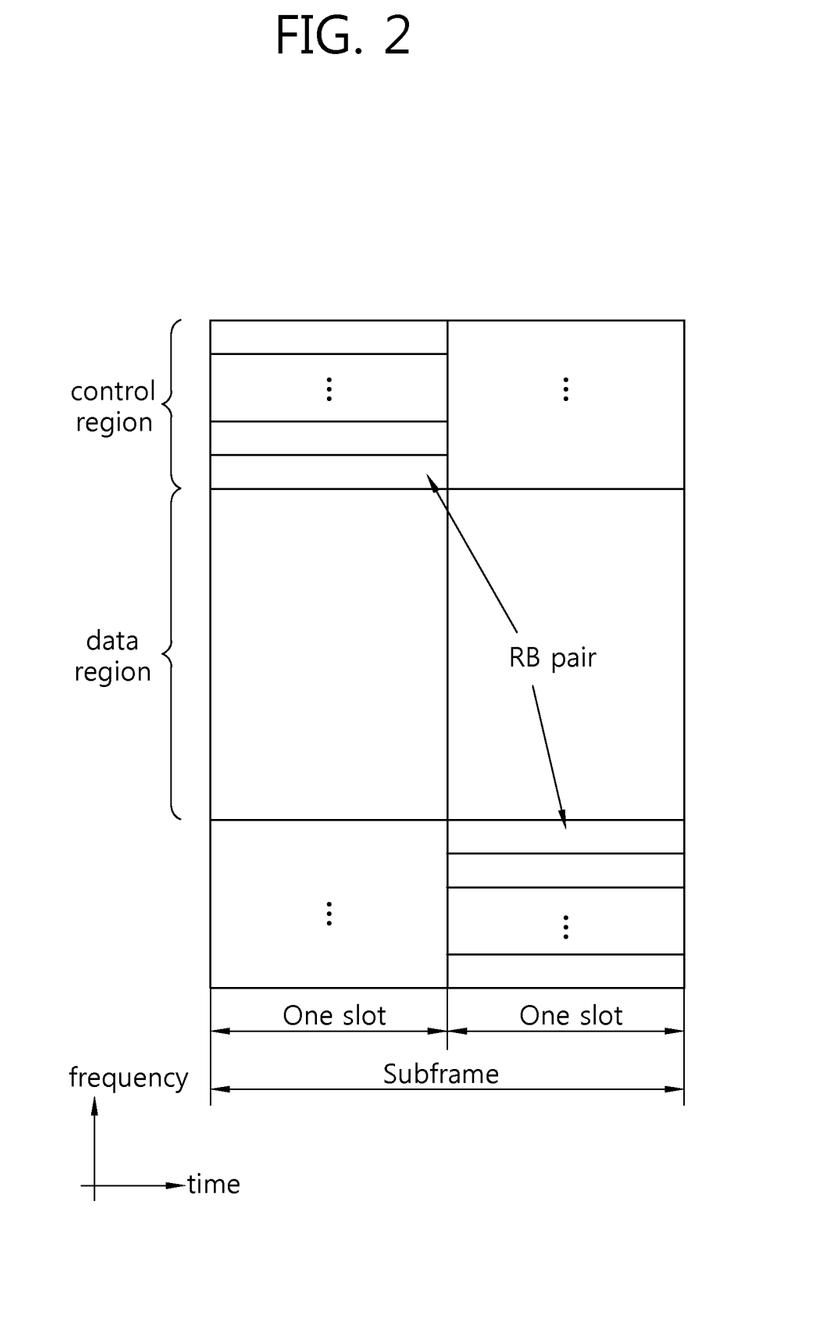
FIG. 2 shows a structure of an uplink (UL) subframe in 3GPP LTE.

FIG. 2 shows a structure of a UL subframe in 3GPP LTE.

A UL subframe can be divided into a control region and a data region. The control region is a region to which a physical uplink control channel (PUCCH) carrying UL control information is allocated. A data region is a region to which a physical uplink shared channel (PUSCH) carrying user data is allocated.

The PUCCH is allocated in an RB pair in a subframe. RBs belonging to the RB pair occupy different subcarriers in each of a $1^{st}$ slot and a $2^{nd}$ slot. m is a location index indicating a logical frequency-domain location of the RB pair allocated to the PUCCH in the subframe.

It shows that RBs having the same value m occupy different subcarriers in the two slots.

The PUSCH is allocated by a UL grant on a PDCCH. Although not shown, a $4^{th}$ OFDM symbol of each slot of a normal CP is used in transmission of a demodulation reference signal (DM RS).

Uplink control information (UCI) includes at least any one of HARQ ACK/NACK, channel state information (CSI), and scheduling request (SR). Hereinafter, as an index of indicating a state of a DL channel, the CSI may include at least any one of a channel quality indicator (CQI) and a precoding matrix indicator (PMI).

PUCCH formats are defined as below in order to represent combinations of UCI and PUCCH and various PUCCH transmissions.

TABLE 1

| PUCCH format | UCI to be transmitted |
| --- | --- |
| PUCCH format 1 | Positive SR |
| PUCCH format 1a/1b | 1 bit or 2 bits HARQ ACK/NACK |
| PUCCH format 2 | CSI reporting |
| PUCCH format 2a/2b | CSI reporting and 1 bit or 2 bits HARQ ACK/NACK |
| PUCCH format 3 | HARQ ACK/NACK, SR, CSI |

A PUCCH format 3 carries 48 bits encoded UCI. The PUCCH format 3 may carry HARQ ACK/NACKs for a plurality of serving cells and CSI for one serving cell.

Figure 3:
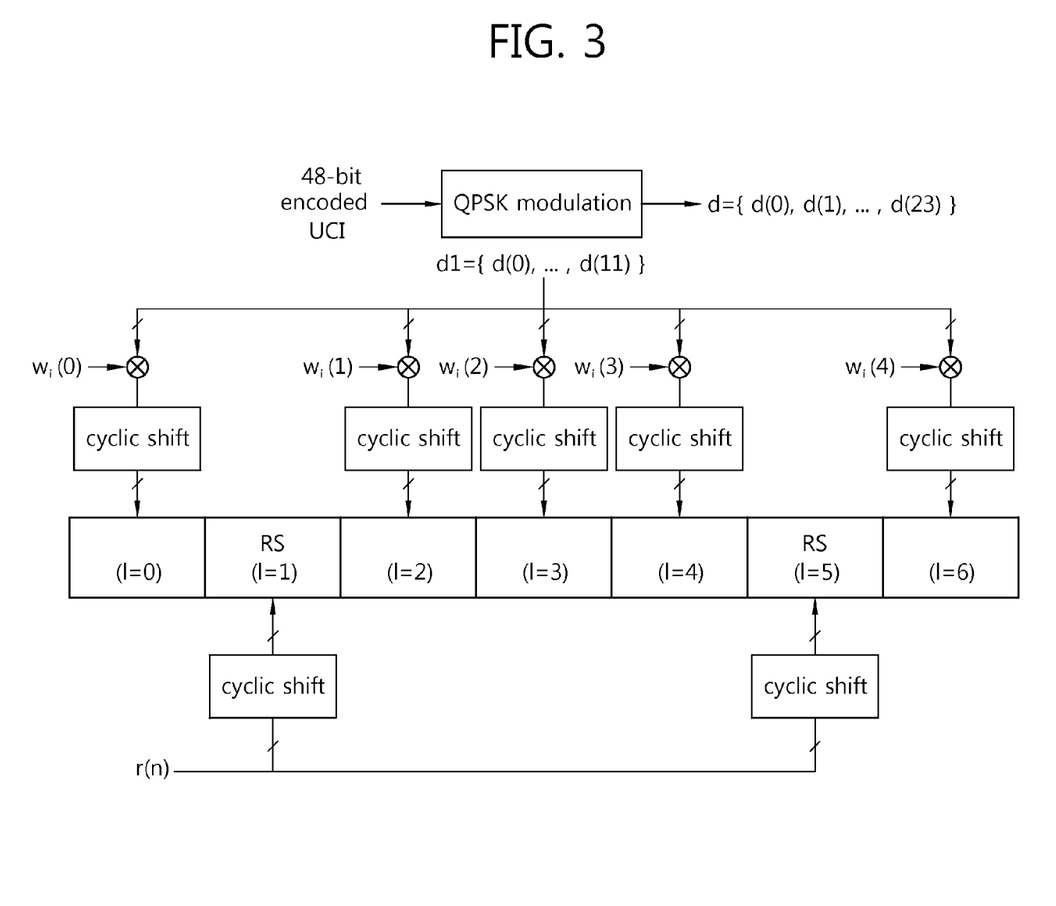
FIG. 3 shows an example of a structure of a physical uplink control channel (PUCCH) format 3 in a normal cyclic prefix (CP) case.

FIG. 3 shows an example of a structure of a PUCCH format 3 in a normal CP case.

One slot includes 7 OFDM symbols. l denotes an OFDM symbol number in the slot, and has a value in the range of 0 to 6. Two OFDM symbols with l=1, 5 are used as RS OFDM symbols for a reference signal, and the remaining OFDM symbols are used as data OFDM symbols for a UCI signal.

A symbol sequence d={d(0), d(1), . . . , d(23)} is generated by performing QPSK modulation on a 48-bit encoded UCI (e.g., encoded ACK/NACK). d(n)(n=0, 1, . . . , 23) is a complex-valued modulation symbol. The symbol sequence d can be regarded as a set of modulation symbols. The number of bits of the UCI or a modulation scheme is for exemplary purposes only, and thus the present invention is not limited thereto.

Figure 4:
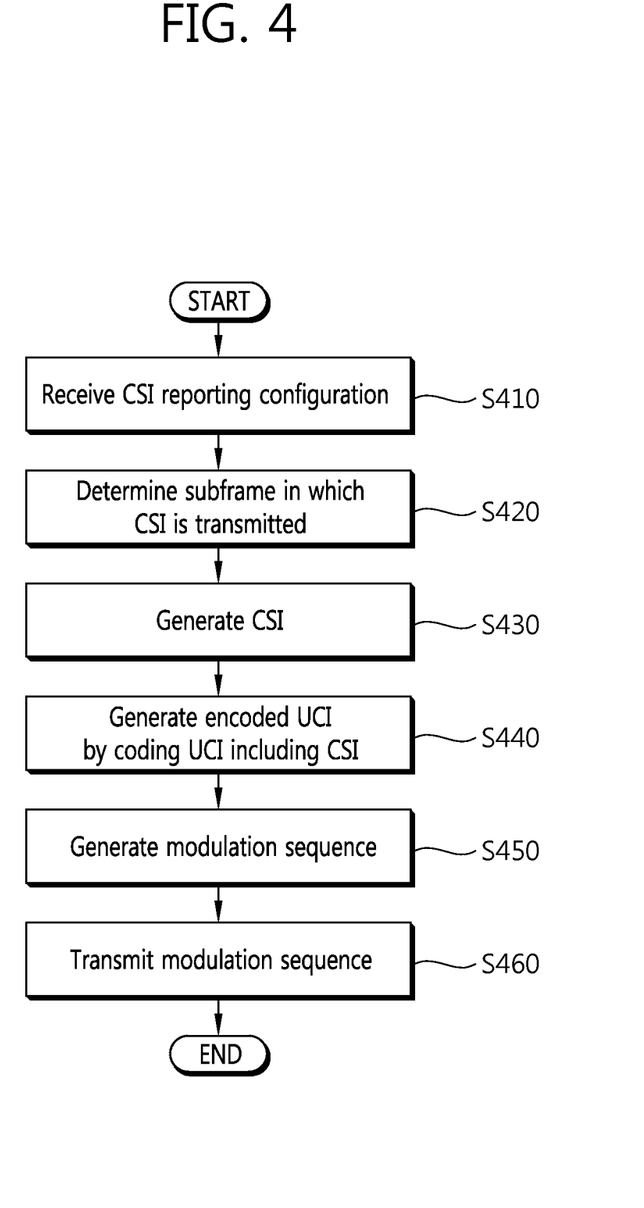
FIG. 4 is a flowchart showing a channel state information (CSI) reporting method according to an embodiment of the present invention.

One PUCCH uses one RB, and one subframe includes a first slot and a second slot. A symbol sequence d={d(0), d(1), . . . , d(23)} is divided into two sequences d1={d(0), . . . , d(11)} and d2={d(12), . . . , d(23)}, each having a length of 12. The first sequence d1 is transmitted in the first slot, and the second sequence d2 is transmitted in the second slot. In FIG. 4, the first sequence d1 is transmitted in the first slot.

The symbol sequence is spread with an orthogonal sequence $w_i$. Symbol sequences are mapped to respective data OFDM symbols. An orthogonal sequence is used to identify a PUCCH (or UE) by spreading the symbol sequence across the data OFDM symbols.

Two RS OFDM symbols are transmitted by mapping an RS sequence used for demodulation of UCI.

Now, UCI coding in 3GPP LTE is described with reference to the section 5 of 3GPP TS 36.212 V10.4.0 (2011-12) "Evolved Universal Terrestrial Radio Access (E-UTRA); Multiplexing and channel coding (Release 10)".

CSI, rank indicator (RI), and HARQ ACK/NACK are coded independently

First, CSI coding for a PUSCH is described.

CSI $o_0, o_1, \ldots, o_{O-1}$ (where O is the number of bits of the CSI) is subjected to channel coding to generate a control information bit sequence $q_0, q_1, \ldots, q_{N_L \cdot Q_{CI}-1}$. $N_L$ denotes the number of layers to which a UL transport block is mapped, and $Q_{CQI}$ denotes the number of bits for each layer that can be used for the CSI.

For example, a (32, O) block code (also referred to as a Reed-Muller (RM) code) may be used as channel coding for the CSI.

$b_0, b_1, \ldots, b_{31}$ denote an intermediate sequence for CQI channel coding and can be generated by the following equation.

$$b_i = \sum_{n=0}^{O-1} (o_n \cdot M_{i,n}) \bmod 2 \quad \text{[Equation 1]}$$

Herein, i=0, 1, . . . , 31. $M_{i,n}$ is a basis sequence for the (32, O) block code, and may be defined as the following table.

TABLE 2

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
| --- | --- | --- | --- | --- | --- | --- | --- | --- | --- | --- | --- |
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |

TABLE 2-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

The control information bit sequence $q_0, q_1, q_{Q-1}$ is generated by circularly repeating the intermediate sequence $b_0, b_1, \ldots, b_{31}$ according to the following equation.

$$q_i = b_{(i \bmod 32)} \quad \text{[Equation 2]}$$

Herein, $i = 0, 1, \ldots, N_L Q_{CQI} - 1$.

A data bit sequence $f_0, f_1, \ldots, f_{G-1}$ is multiplexed together with the CSI bit sequence into a multiplexed sequence $g_0, g_1, \ldots, g_{H-1}$. In the multiplexed symbol sequence, the CSI may be first arranged, and thereafter a UL transport block may be arranged. H denotes the total number of bits allocated to the PUSCH, and is defined as $H = G + N_L Q_{CQI}$. Herein, $q_i$ is a modulation symbol on constellation, and $H' = H/Q_m$. $Q_m$ denotes the number of bits for each modulation symbol of a modulation scheme. For example, when quadrature phase shift keying (QPSK) is used as the modulation scheme, $Q_m = 2$.

Now, CSI coding for a PUCCH format 2 is described.

UCI (e.g., CSI) $u_0, u_1, \ldots, u_{A-1}$ (where A is the number of bits of the UCI) is subjected to channel coding to generate an encoded bit sequence $b_0, b_1, \ldots, b_{B-1}$. B is the number of bits capable of transmitting a corresponding PUCCH. Since the PUCCH format 2 can transmit 20-bit coded UCI, B=20.

A (20, A) block code (or also referred to as a Reed-Muller (RM) code) may be used as channel coding for the PUCCH format 2. This can be expressed as follows.

$$b_i = \sum_{n=0}^{A-1} (u_n \cdot M_{i,n}) \bmod 2 \quad \text{[Equation 3]}$$

Herein, $i = 0, 1, \ldots, B-1$. $M_{i,n}$ is a basis sequence for a (20, A) block code, and may be defined as the following table.

TABLE 3

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 1 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 0 | 0 | 1 | 0 | 1 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 0 | 0 | 0 | 0 | 0 | 0 |
| 19 | 1 | 0 | 0 | 0 | 0 | 1 | 1 | 0 | 0 | 0 | 0 | 0 | 0 |

Now, RI or HARQ ACK/NACK coding is described.

UCI (e.g., RI or HARQ ACK/NACK) $u_0, u_1, \ldots, u_{A-1}$ (where A is the number of bits of the UCI) is subjected to channel coding to generate an encoded bit sequence $q_0, q_1, \ldots, q_{B-1}$. B is the number of bits capable of transmitting a corresponding PUCCH. Since the PUCCH format 3 can transmit coded UCI of 48 bits, B=48.

The PUCCH format 3 may transmit up to 48 bits, but channel coding uses a basis sequence for a (32, A) block code of Table 2. Therefore, according to whether the number A of UCI bits is greater than the number of RM bases (or also referred to as a basis sequence), coding is achieved as follows. According to Table 2, the number of RM bases is 11.

If $A <= 11$, the following is satisfied.

An intermediary sequence $b_0, b_1, \ldots, b_{31}$ for channel coding is generated as follows.

$$b_i = \sum_{n=0}^{A-1} (u_n \cdot M_{i,n}) \bmod 2 \quad \text{[Equation 4]}$$

Herein, i=0, 1, . . . , 31, and $M_{i,n}$ is a basis sequence for the (32, 0) block code of Table 1.

A control information bit sequence $q_0, q_1, \ldots, q_{B-1}$ is generated by circularly repeating the intermediary sequence $b_0, b_1, \ldots, b_{31}$ as follows.

$$q_i = b_{(i \bmod 32)} \quad \text{[Equation 5]}$$

Herein, i=0, 1, [Equation 5]B−1.

If 11<A<=21, the following is satisfied.

Two intermediary sequences $b^1_i$ and $b^2_i$ are generated as follows.

$$b_i^1 = \sum_{n=0}^{\lceil A/2 \rceil -1} (u_n \cdot M_{i,n}) \bmod 2, \quad \text{[Equation 6]}$$

$$b_i^2 = \sum_{n=0}^{A-\lceil A/2 \rceil -1} (u_{\lceil A/2 \rceil + n} \cdot M_{i,n}) \bmod 2$$

Herein, i=0, 1, . . . , 23.

The control information bit sequence $q_0, q_1, \ldots, q_{B-1}$ is obtained by concatenating the intermediary sequences.

$$q_i = b_j^1, q_{i+1} = b_{j+1}^1, q_{i+2} = b_j^2, q_{i+4} = b_{j+1}^2 \quad \text{[Equation 7]}$$

If A<=1 11, since one RM block code (or one RM encoder) is used, this is called single RM. If A>11, since two RM block codes (or two RM encoders) are used, this is called dual RM.

Now, CSI reporting in 3GPP LTE is described with reference to the section 7.2 of 3GPP TS 36.213 V10.4.0 (2011-12) "Evolved Universal Terrestrial Radio Access (E-UTRA); Physical layer procedures (Release 10)".

The CSI reporting is classified into aperiodic CSI reporting and periodic CSI reporting. The aperiodic CSI reporting is that a wireless device reports CSI at a request of a BS. The periodic CSI reporting is that the wireless device reports CSI in a periodicity predetermined by the BS.

Since various transmission modes such as single antenna transmission, multiple antenna transmission, etc., are supported by the wireless device, various CSI reporting modes are provided. The following table is an example of a reporting mode for periodic CSI reporting.

TABLE 4

|  | PMI Feedback Type No PMI | PMI Feedback Type No PMI |
| --- | --- | --- |
| wideband CQI | Mode 1-0 | Mode 1-0 |
| subband CQI | Mode 2-0 | Mode 2-0 |

One or more reporting modes may be configured for the wireless device.

In addition to the reporting mode, a reporting type shown in the following table is also defined.

TABLE 5

| Reporting Type | Contents |
| --- | --- |
| Type 1 | subband CQI |
| Type 1a | subband CQI and second PMI |
| Type 2/2b/2c | wideband CQI and PMI |
| Type 2a | wideband PMI |
| Type 3 | RI |
| Type 4 | wideband CQI |
| Type 5 | RI and wideband PMI |
| Type 6 | RI and PTI |

In the reporting mode, which CSI will be reported is determined. Information included in the CSI is determined according to the report type in a specific reporting mode. That is, the CSI may include at least one of the followings.

Rank indicator (RI)

Subband CQI: A CQI for any one of S (S>1) subbands. A size of the subband may vary depending on a size of a system band.

Wideband CQI: A CQI for S subbands.

Wideband PMI: A PMI for S subbands.

Precoding type indicator (PTI): Type for a PMI.

A payload size of information included in each reporting type varies as shown in the following table according to a reporting mode and a mode state. Herein, L>=0, and AP is an acronym of 'antenna port', and SM is an acronym of 'spatial multiplexing'.

TABLE 6

| | | | Reporting Modes | | | |
| --- | --- | --- | --- | --- | --- | --- |
| Reporting Type | Reported | Mode State | Mode 1-1 (bits/BP) | Mode 2-1 (bits/BP) | Mode 1-0 (bits/BP) | Mode 2-0 (bits/BP) |
| 1 | Subband CQI | RI = 1 | NA | 4 + L | NA | 4 + L |
| | | RI > 1 | NA | 7 + L | NA | 4 + L |
| 1a | Subband CQI/ second PMI | 8 APs RI = 1 | NA | 8 + L | NA | NA |
| | | 8 APs 1 < RI < 5 | NA | 9 + L | NA | NA |
| | | 8 APs RI > 4 | NA | 7 + L | NA | NA |
| 2 | Wideband CQI/PMI | 2 APs RI = 1 | 6 | 6 | NA | NA |
| | | 4 APs RI = 1 | 8 | 8 | NA | NA |
| | | 2 APs RI > 1 | 8 | 8 | NA | NA |
| | | 4 APs RI > 1 | 11 | 11 | NA | NA |
| 2a | Wideband first PMI | 8 APs RI < 3 | NA | 4 | NA | NA |
| | | 8 APs 2 < RI < 8 | NA | 2 | NA | NA |
| | | 8 APs RI = 8 | NA | 0 | NA | NA |
| 2b | Wideband CQI/ second PMI | 8 APs RI = 1 | 8 | 8 | NA | NA |
| | | 8 APs 1 < RI < 4 | 11 | 11 | NA | NA |
| | | 8 APs RI = 4 | 10 | 10 | NA | NA |
| | | 8 APs RI > 4 | 7 | 7 | NA | NA |
| 2c | Wideband CQI/first PMI/ | 8 APs RI = 1 | 8 | NA | NA | NA |
| | | 8 APs 1 < RI ≤ 4 | 11 | NA | NA | NA |
| | | 8 APs 4 < RI ≤ 7 | 9 | NA | NA | NA |

TABLE 6-continued

| Reporting Type | Reported | Mode State | Mode 1-1 (bits/BP) | Mode 2-1 (bits/BP) | Mode 1-0 (bits/BP) | Mode 2-0 (bits/BP) |
|---|---|---|---|---|---|---|
| | second PMI | 8 APs RI = 8 | 7 | NA | NA | NA |
| 3 | RI | 2/4 APs, 2-layer SM | 1 | 1 | 1 | 1 |
| | | 8 APs, 2-layer SM | 1 | NA | NA | NA |
| | | 4 APs, 4-layer SM | 2 | 2 | 2 | 2 |
| | | 8 APs, 4-layer SM | 2 | NA | NA | NA |
| | | 8-layer SM | 3 | NA | NA | NA |
| 4 | Wideband CQI | RI = 1 or RI > 1 | NA | NA | 4 | 4 |
| 5 | RI/first PMI | 8 APs, 2-layer SM | 4 | NA | NA | NA |
| | | 8 APs, 4 and 8-layer SM | 5 | | | |
| 6 | RI/PTI | 8 APs, 2-layer SM | NA | 2 | NA | NA |
| | | 8 APs, 4-layer SM | NA | 3 | NA | NA |
| | | 8 APs, 8-layer SM | NA | 4 | NA | NA |

Accordingly, when periodic CSI is sent, a payload of CSI may vary for every subframe according to a transmission state and a report type. If a previously transmitted RI and/or PTI are incorrect, an error may occur between the BS and the wireless device as to a subsequent CSI payload size, which may cause a CSI decoding error or reliability deterioration.

For example, it is assumed that RI=2 is previously reported when the mode 2-1 and the 8 APs are configured. According to Table 6, the number of bits of a wideband CQI/PMI currently reported is 11. However, if the BS fails to receive RI=2 previously reported, the BS does not exactly know the number of bits of the wideband CQI/PMI currently reported.

Hereinafter, a method of decreasing a reception error of UCI is proposed according to an embodiment of the present invention.

CSI may be classified into RI CSI and non-RI CSI. The RI CSI denotes CSI including an RI, and non-RI denotes CSI not including the RI. For example, the reporting types 1, 1a, 2, 2a, 2b, 2c, 4 of Table 5 correspond to the non-RI CSI, and the remaining reporting types correspond to the RI CSI.

The non-RI CSI may include a CQI and/or a PMI whose value and the number of bits are determined according to an RI or a PTI. The CQI may include a subband CQI and/or a wideband CQI.

FIG. 4 is a flowchart showing a CSI reporting method according to an embodiment of the present invention. This method may be performed by a wireless device.

In step S410, the wireless device receives a CSI reporting configuration from a BS. The CSI reporting configuration may include information indicating a periodicity and offset for periodic CSI reporting.

In step S420, the wireless device determines a subframe for transmitting CSI among a plurality of subframes on the basis of the CSI reporting configuration.

In step S430, the wireless device generates CSI for one or more serving cells according to a reporting mode. For example, the CSI may include RI CSI of a $1^{st}$ serving cell and non-RI CSI of a $2^{nd}$ serving cell. An example of configuring a bit of the CSI for each serving cell is described below.

In step S440, the wireless device codes UCI including the CSI to generate encoded UCI. The UCI may further include HARQ ACK/NACK bits for one or more serving cells and/or a scheduling request (SR) bit.

Channel coding may include RM coding using a (32, A) block code of Table 2. Single RM or dual RM for the aforementioned PUCCH format 3 may be used. The total number of bits of the encoded UCI may be 48 bits.

In step S450, the wireless device modulates the UCI to generate a modulation sequence. There is no restriction on a modulation scheme, and a well-known scheme such as BPSK, QPSK, 8-QAM, 16-QAM, etc., may be used.

In step S460, the wireless device transmits the modulation sequence through an uplink channel. The uplink channel may be a PUCCH.

Now, an example of configuring bits of CSI is described.

In one embodiment, a payload size of non-RI CSI may be defined to a specific value. For example, the payload size of the non-RI CSI may be fixed to 11 bits. A payload size of RI CSI may vary depending on a transmission state and a reporting type as shown in the example of Table 6.

In another embodiment, the payload size of the non-RI CSI may be pre-defined according to the number of reporting types or antenna ports. The following table shows an example of the payload size of the non-RI CSI according to the number of antenna ports.

TABLE 7

| The number of antenna ports | Non-RI CSI with wideband CQI | Non-RI CSI with subband CQI | Wideband PMI |
|---|---|---|---|
| 2 | 8 | 7 + L | — |
| 4 | 11 | 7 + L | — |
| 8 | 11 | 11 | 11 |

For each piece of CSI, a maximum value may be selected in all reporting types.

In another embodiment, a payload size of CSI may be determined as a sum of a total sum of the maximum number of bits of a CQI and a total sum of the maximum number of bits of information other than the CQI. The total sum of the maximum number of bits of the CQI may be defined to 7. In addition, the information other than the CQI may be limited to a PMI. If the sum of the total sum of the maximum number of bits of the CQI and the total sum of the maximum number of bits of information other than the CQI exceeds a specific value (e.g., 11), it may be limited to the specific value.

The following table shows an example of a payload size of non-RI CSI according to the number of antenna ports.

TABLE 8

| The number of antenna ports | Non-RI CSI with wideband CQI | Non-RI CSI with subband CQI | Wideband PMI |
|---|---|---|---|
| 2 | 9 | 7 + L | — |
| 4 | 11 | 7 + L | — |
| 8 | 11 | 11 | 11 |

The payload size of non-RI CSI may be determined by the BS according to corresponding information.

The determined payload size may be used as a criterion of a coding scheme and/or resource mapping, when HARQ ACK/NACK and CSI are transmitted as one piece of UCI.

If the payload size is fixed as shown in Table 7 or Table 8 above, and if the number of bits of corresponding CSI is small, padding bits or reserved bits may be attached to the CSI to adjust a size. For example, although a payload size of non-RI CSI with a wideband CQI is set to 11 bits, if the number of bits of the wideband CQI is 8 bits, a 3-bit padding bit or reserved bit may be attached.

The BS may decode the non-RI CSI by considering a fixed payload size. In this case, a Euclidean distance between code vectors may become relatively close due to a reserved bit, which may result in a deterioration of a UCI detection performance. To reduce this, a power adjustment parameter may be determined as follows.

If the transmit diversity is not applied or the number of bits of information to be encoded is less than or equal to 11, the power adjustment parameter is as follows.

$$h(n_{CSI}) = \frac{n_{CSI} - 1}{2} \quad \text{[Equation 8]}$$

If the transmit diversity is applied or the number of bits of information to be encoded is greater than 11, the power adjustment parameter is as follows.

$$h(n_{CSI}) = \frac{n_{CSI} - 1}{3} \quad \text{[Equation 9]}$$

In Equations 8 and 9, $n_{CSI}$ is a specific value (e.g., 11) in case of CSI which varies depending on a recently transmitted RI/PTI, and is the number of corresponding bits in case of CSI having a payload size fixed or predetermined according to the aforementioned embodiment (e.g., Table 7 or Table 8).

CSI transmitted on an uplink channel may include a CSI report for one or more serving cells. In this case, the number of CSI reports may be limited to one or two.

As described above, if the number of bits of actual CSI is less than the target number of bits, a padding bit may be attached. The following is a detailed example of attaching the padding bit.

In one embodiment, a padding bit may be attached after a least significant bit (LSB) of actual CSI. The actual CSI is encoded based on an RM basis having a low index.

In another embodiment, CSI may be divided into 2 parts, and a padding bit may be attached according to a type of the CSI. Information included in the CSI is divided into CQI and non-CQI (e.g., a PMI, a subband index, etc.), and a padding bit is attached to each of them.

Figure 5:
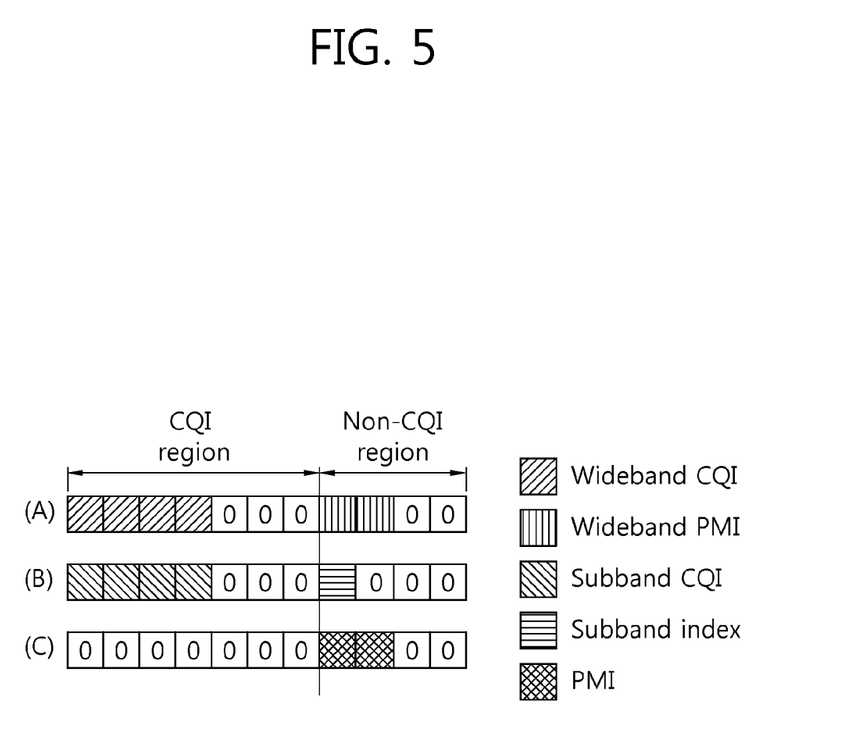
FIG. 5 shows an example of attaching a padding bit.

FIG. 5 shows an example of attaching a padding bit.

It is assumed that the target number of bits of CSI is 11, the target number of bits of a CQI is 7, and the target number of bits of a non-CQI is 4. The number of bits is for exemplary purposes only.

Case (A) shows that a 3-bit padding bit is attached to a 4-bit wideband CQI, and a 2-bit padding bit is attached to a 2-bit wideband PMI.

Case (B) shows that a 3-bit padding bit is attached to a 4-bit subband CQI, and a 3-bit padding bit is attached to a 1-bit subband index.

Case (C) shows that 7 bits are all filled with padding bits when a CQI is absent.

Now, a power control of an uplink channel is described according to an embodiment of the present invention.

Referring to the section 5 of 3GPP TS 36.213 V10.4.0, transmit power $P_{PUCCH}(i)$ for PUCCH transmission at a subframe i is defined as follows.

$$P_{PUCCH}(i) = \min\{P_{CMAX}, P_{0\_PUCCH} + PL + h(n_{CQI}, n_{HARQ}, n_{SR}) + \Delta_{F\_PUCCH}(F') + \Delta_{TxD}(F') + g(i)\} \quad \text{[Equation 10]}$$

Herein, $P_{CMAX}$ is transmit power configured for a UE, $P_{O\_PUCCH}(j)$ is a parameter determined as a sum of $P_{O\_NOMINAL\_PUCCH}(j)$ which is a cell-specific element given by a higher layer and $P_{O\_UE\_PUCCH}(j)$ which is a UE-specific element, PL is a DL pathloss estimation calculated by a wireless device, $h(n_{CQI}, n_{HARQ}, n_{SR})$ is a value dependent on a PUCCH format, where $n_{CQI}$ is the number of bits of CSI, $n_{HARQ}$ is the number of bits of HARQ ACK/NACK, and $n_{SR}$ is the number of bits of SR, $\Delta_{F\_PUCCH}(F)$ is a parameter given by the higher layer, $\Delta_{TxD}(F')$ is a parameter given by the higher layer, and g(i) is a UE-specific value acquired from TPC.

More specifically, $h(n_{CQI}, n_{HARQ}, n_{SR})$ is determined as follows.

i) For a PUCCH format 3 without periodic CSI reporting, if the PUCCH format 3 is configured with 2-antenna port transmission or if UCI is greater than 11, $$h(n_{CQI}, n_{HARQ}, n_{SR}) = \frac{n_{HARQ} + n_{SR} - 1}{3}$$

otherwise, $$h(n_{CQI}, n_{HARQ}, n_{SR}) = \frac{n_{HARQ} + n_{SR} - 1}{2}.$$

ii) For a PUCCH format 3 with periodic CSI reporting, if the PUCCH format 3 is configured with 2-antenna port transmission or if UCI is greater than 11, $$h(n_{CQI}, n_{HARQ}, n_{SR}) = \frac{n_{HARQ} + n_{SR} + n_{CQI} - 1}{3}$$

otherwise, $$h(n_{CQI}, n_{HARQ}, n_{SR}) = \frac{n_{HARQ} + n_{SR} + n_{CQI} - 1}{2}.$$

The UCI of the PUCCH format 3 may include HARQ ACK/NACK and CSI. In general, an error rate requirement for the HARQ ACK/NACK is set to be higher than a block error rate requirement for the CSI. For example, it is known that a probability that HARQ NACK is incorrectly detected as HARQ ACK is set to be less than $10^{-3}$, and a block error rate for the CSI is set to be less than $10^{-2}$.

It is proposed to control transmit power by considering various error rate requirements when UCI having two or more types of information is transmitted on one uplink channel.

Hereinafter, the UCI includes a bit sequence which is not yet encoded and which is transmitted on an uplink channel (e.g., a PUCCH format 3). The UCI may include HARQ ACK/NACK for one or more serving cells and/or CSI for one or more serving cells. To configure the CSI, the embodiment of FIG. 4 may be applied.

For clarity of the explanation, if the UCI includes only the HARQ ACK/NACK, it is called UCI1. If the UCI includes both the HARQ ACK/NACK and the CSI, it is called UCI2. If the UCI includes only the CSI, it is called UCI3.

Since channel coding is performed based on an RM code in the PUCCH format 3, single RM or dual RM is determined according to a payload size of the UCI. Therefore, a bit experiences a different error protection according to mapping with respect to an RM basis. Since the UCI1 includes only HARQ ACK/NACK, transmit power may be controlled on the basis of a case where an error protection level for entire information bits is lowest. Since the UCI2 includes HARQ ACK/NACK and CSI, the transmit power may be controlled on the basis of a case where the error protection level for an information bit corresponding to the HARQ ACK/NACK is lowest.

If the UCI1 and the UCI2 have the same payload size, it is possible that transmit power of the UCI2 can be more saved than the UCI1. When the error protection level of the HARQ ACK/NACK is set relatively higher than the error protection level of the CSI, the transmit power saving may be increased.

As described above, transmit power of a PUCCH is dependent on a function $h(n_{CQI}, n_{HARQ}, n_{SR})$ of an information bit of UCI.

A detailed example of determining $h(n_{CQI}, n_{HARQ}, n_{SR})$ is proposed hereinafter.

(1) When the number of bits of HARQ ACK/NACK is 0 (UCI3 case).

This is a case where only CSI is transmitted in a PUCCH format 3. A required signal-to-noise ratio (SNR) for satisfying an error requirement may be lower in the UCI3 than in the UCI1 and the UCI2.

The following is an equation for determining $h(n_{CQI}, n_{HARQ}, n_{SR})$ for the UCI3.

$$h(n_{CQI}, n_{HARQ}, n_{SR}) = \frac{\alpha n_{CQI} - \beta}{l} \quad \text{[Equation 11]}$$

Herein, $0<\alpha<=1$. Alternatively, it be fixed such as $\alpha=0.8$. When coding is performed using single RM and transmit diversity is used, $l=2$, and otherwise $l=3$. $\beta$ may be a parameter obtained on the basis of a required SNR of the UCI1 and a required SNR of the UCI3. For example, $\beta$ may be defined based on a difference value between the required SNR of the UCI1 and the required SNR of the UCI3.

(2) When the number bits of HARQ ACK/NACK is not 0 (UCI2 case)

When joint coding is performed on HACK ACK/NACK and CSI, a required SNR is dominated by the HARQ ACK/NACK. $h(n_{CQI}, n_{HARQ}, n_{SR})$ may be determined as follows.

The following equation is for a case where power control is performed so that an error requirement is satisfied according to HARQ ACK/NACK.

$$h(n_{CQI}, n_{HARQ}, n_{SR}) = \frac{n_{HARQ} + n_{SR} - 1 + n_{CQI} - \beta}{l} \quad \text{[Equation 12]}$$

The following equation is for a case where power control is performed so that an error requirement is satisfied according to both HARQ ACK/NACK and CSI.

$$h(n_{CQI}, n_{HARQ}, n_{SR}) = \frac{n_{HARQ} + n_{SR} - 1 + \alpha n_{CQI} - \beta}{l} \quad \text{[Equation 13]}$$

Meanwhile, the PUCCH format 3 may also be transmitted together with a sounding reference signal (SRS) in one subframe. In this case, after mapping the PUCCH to OFDM symbols of the subframe, a last OFDM symbol of the subframe is punctured, and the SRS is transmitted in the punctured OFDM symbol. This implies that the PUCCH format 3 is transmitted except for the last OFDM symbol of the subframe, which is called a shortened PUCCH format.

When the PUCCH and the SRS are transmitted simultaneously, due to the OFDM symbol to be punctured, effective code rates of corresponding UCI are increased, which may cause a deterioration of an error correction performance. For example, although the total number of modulation symbols is 120 in case of a normal PUCCH format 3, the number thereof is decreased to 108 in case of the shortened PUCCH format.

With an increase in the number of bits of the UCI, a code rate difference between the normal PUCCH format 3 and the shortened PUCCH format is increased linearly. In addition, with the increase in the number of bits of the UCI, a required SNR for satisfying an error requirement of the UCI may be increased. Therefore, the shortened PUCCH format requires a more accurate power control than the normal PUCCH format 3.

The following equation indicates transmit power $P_{PUCCH}(i)$ for PUCCH transmission at a subframe i according to an exemplary embodiment of the present invention.

$$P_{PUCCH}(i) = \min\{P_{CMAX}, P_{0\_PUCCH} + PL + h(n_{CQI}, n_{HARQ}, n_{SR}) + \Delta_{F\_PUCCH}(F") + \Delta_{TxD}(F") + g(i) + \Delta_s(F")\} \quad \text{[Equation 14]}$$

Herein, $\Delta_s(F")$ is an offset parameter for a shortened PUCCH format. The offset parameter may be predefined or may be given by the BS. For a normal PUCCCH format, it may be set to $\Delta_s(F")=0$.

The offset parameter may be determined based on a code rate. Alternatively, it may be set to $\Delta_s(F")>=10 \log(10/9)$.

Alternatively, similarly to the existing PUCCH transmit power of Equation 10, PUCCH transmission power may be acquired as follows.

$$P_{PUCCH}(i) = \min\{P_{CMAX}, P_{0\_PUCCH} + PL + h'(n_{CQI}, n_{HARQ}, n_{SR}) + \Delta_{F\_PUCCH}(F") + \Delta_{TxD}(F") + g(i)\} \quad \text{[Equation 15]}$$

Herein, $h'(n_{CQI}, n_{HARQ}, n_{SR})$ may be determined by Equation 16 or Equation 17 below.

$$h'(n_{CQI}, n_{HARQ}, n_{SR}) = h(n_{CQI}, n_{HARQ}, n_{SR}) + \gamma \quad \text{[Equation 16]}$$

$$h'(n_{CQI}, n_{HARQ}, n_{SR}) = h(n_{CQI}, n_{HARQ}, n_{SR}) \gamma \quad \text{[Equation 17]}$$

Herein, it may be set to $\gamma=0$ for a normal PUCCH format, and otherwise, $\gamma$ may be set to a value predefined or given by the BS. h'($n_{CQI}$, $n_{HARQ}$, $n_{SR}$) may be the same as in the existing 3GPP LTE, or may be defined by Equation 11 to Equation 13.

The modified transmit power may be applied in all subframes in which a shortened PUCCH format is transmitted or a subframe in which the shortened PUCCH format is transmitted for periodic CSI. Whether to apply the modified transmit power may be reported by the BS to the wireless device.

Figure 6:
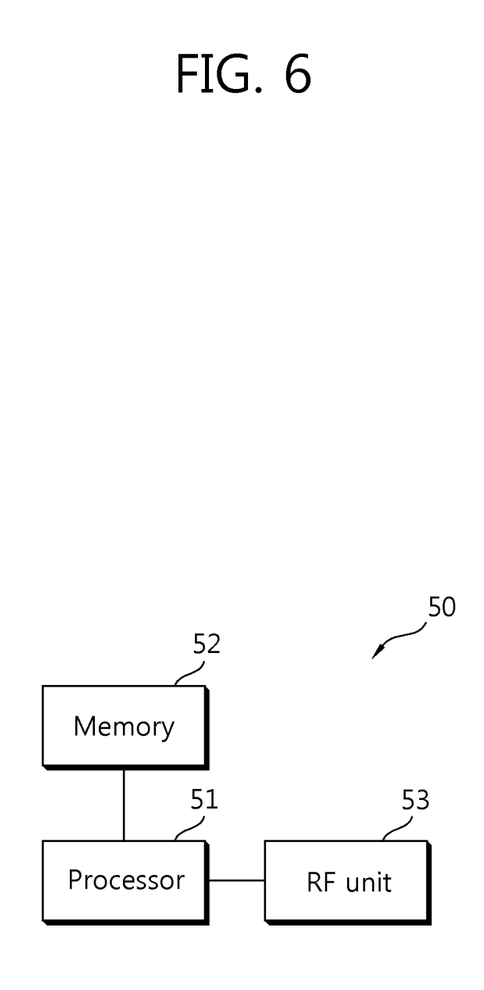
FIG. 6 is a block diagram of a wireless device according to an embodiment of the present invention.

FIG. 6 is a block diagram of a wireless device according to an embodiment of the present invention.

A wireless device 50 includes a processor 51, a memory 52, and a radio frequency (RF) unit 53.

The memory 52 is coupled with the processor 51, and stores instructions executed by the processor 51. When the aforementioned embodiment is implemented with software, an instruction for executing the software may be stored in the memory 52.

The RF unit 53 is coupled with the processor 51, and transmits and/or receives a radio signal. UCI may be transmitted on a PUCCH or a PUSCH by the RF unit 53.

The processor 51 implements the proposed functions, procedures, and/or methods. In the aforementioned embodiment, an operation of the wireless device 50 may be implemented by the processor 51.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method of reporting channel state information (CSI) in a wireless communication system, the method comprising:
    receiving a configuration for CSI reporting, the configuration including a periodicity and an offset;
    determining a subframe in which the CSI is reported among a plurality of subframes according to the configuration;
    generating the CSI;
    coding uplink control information (UCI) containing the CSI to generate encoded UCI;
    modulating the encoded UCI to generate a modulation sequence; and
    transmitting the modulation sequence in the determined subframe on an uplink channel,
    wherein, if the CSI includes a rank indicator (RI), a payload size of the CSI is determined according to the RI,
    wherein, if the CSI does not include the RI, the payload size of the CSI is fixed,
    wherein, if a sum of a maximum number of bits of a channel quality indicator (CQI) and a maximum number of bits of a precoding matrix indicator (PMI) is larger than a predetermined value and if the CSI does not includes the RI, the payload size of the CSI is limited to the predetermined value,
    wherein, if a total number of bits of the CSI is smaller than the predetermined value and if the CSI does not includes the RI, the payload of the CSI includes at least one padding bit,
    wherein the at least one padding bit includes a first padding bit and a second padding bit, and
    wherein a first remaining bit of a first region for the CQI is padded with the first padding bit, and a second remaining bit of a second region for the PMI is padded with the second padding bit.

2. The method of claim 1, wherein the at least one padding bit is attached to a least significant bit (LSB) of the CSI.

3. The method of claim 1, wherein the UCI is encoded based on a Reed-Muller (RM) code.

4. The method of claim 1, wherein the UCI is encoded based on a (20, A) RM code or a (32, A) RM code.

5. The method of claim 4, wherein the uplink channel is a physical uplink control channel (PUCCH).

6. A wireless device for reporting channel state information (CSI) in a wireless communication system, the wireless device comprising:
    a memory; and
    a processor operatively coupled to the memory and configured to:
        receive a configuration for CSI reporting, the configuration including a periodicity and an offset;
        determine a subframe in which the CSI is reported among a plurality of subframes according to the configuration;
        generate the CSI;
        code uplink control information (UCI) containing the CSI to generate encoded UCI;
        modulate the encoded UCI to generate a modulation sequence; and
        transmit the modulation sequence in the determined subframe on an uplink channel,
    wherein, if the CSI includes a rank indicator (RI), a payload size of the CSI is determined according to the RI,
    wherein, if the CSI does not include the RI, the payload size of the CSI is fixed,
    wherein, if a sum of a maximum number of bits of a channel quality indicator (CQI) and a maximum number of bits of a precoding matrix indicator (PMI) is larger than a predetermined value and if the CSI does not includes the RI, the payload size of the CSI is limited to the predetermined value,
    wherein, if a total number of bits of the CSI is smaller than the predetermined value and if the CSI does not includes the RI, the payload of the CSI includes at least one padding bit,
    wherein the at least one padding bit includes a first padding bit and a second padding bit, and
    wherein a first remaining bit of a first region for the CQI is padded with the first padding bit, and a second remaining bit of a second region for the PMI is padded with the second padding bit.

* * * * *